219-121
2/20/79 SR
OR 4,140,892

United States Patent [19]

Müller

[11] 4,140,892

[45] Feb. 20, 1979

[54] PLASMA-ARC SPRAYING TORCH

[76] Inventor: Niklaus Müller, Bruderholzstrasse 104, 4053 Basel, Switzerland

[21] Appl. No.: 768,594

[22] Filed: Feb. 14, 1977

[30] Foreign Application Priority Data

Feb. 16, 1976 [CH] Switzerland ........................ 1884/76

[51] Int. Cl.[2] ........................................ B23K 9/04

[52] U.S. Cl. .......................... 219/121 P; 219/75; 219/76.11; 219/76.16

[58] Field of Search ................ 219/121 P, 121 R, 74, 219/75, 76, 120, 123; 313/231.3

[56] References Cited

U.S. PATENT DOCUMENTS

| | | | |
|---|---|---|---|
| 2,093,821 | 9/1937 | Southgate | 219/75 |
| 2,392,736 | 1/1946 | Hensel et al. | 219/120 |
| 2,960,594 | 11/1960 | Thorpe | 219/121 P X |
| 3,294,953 | 12/1966 | Spies, Jr. | 219/121 P |
| 3,304,402 | 2/1967 | Thorpe | 219/121 P |
| 3,312,566 | 4/1967 | Winzeler | 219/121 P |
| 3,790,742 | 2/1974 | Auer | 219/121 P |
| 3,940,641 | 2/1976 | Dooley | 219/123 X |

FOREIGN PATENT DOCUMENTS

| | | | |
|---|---|---|---|
| 939894 | 1/1974 | Canada | 219/121 P |
| 1079638 | 8/1967 | United Kingdom | 219/121 P |
| 1313128 | 1973 | United Kingdom | 219/121 P |

*Primary Examiner*—J. V. Truhe
*Assistant Examiner*—M. Paschall
*Attorney, Agent, or Firm*—Cushman, Darby & Cushman

[57] ABSTRACT

A plasma-arc spraying torch is disclosed which comprises a cathode unit and a separable anode unit which units are connected to each other approximately at a section of the torch in which the cathode of the torch is mounted on a cathode supporting member. The connection of the units and the mounting of their parts are all self-centering. Each unit has its own separate cooling circuit. Cooling of the anode nozzle is provided by a helical water duct within a nozzle holder member surrounding the anode nozzle. The nozzle holder and cathode supporting members are each at least laterally embedded in body parts of insulating material.

12 Claims, 1 Drawing Figure

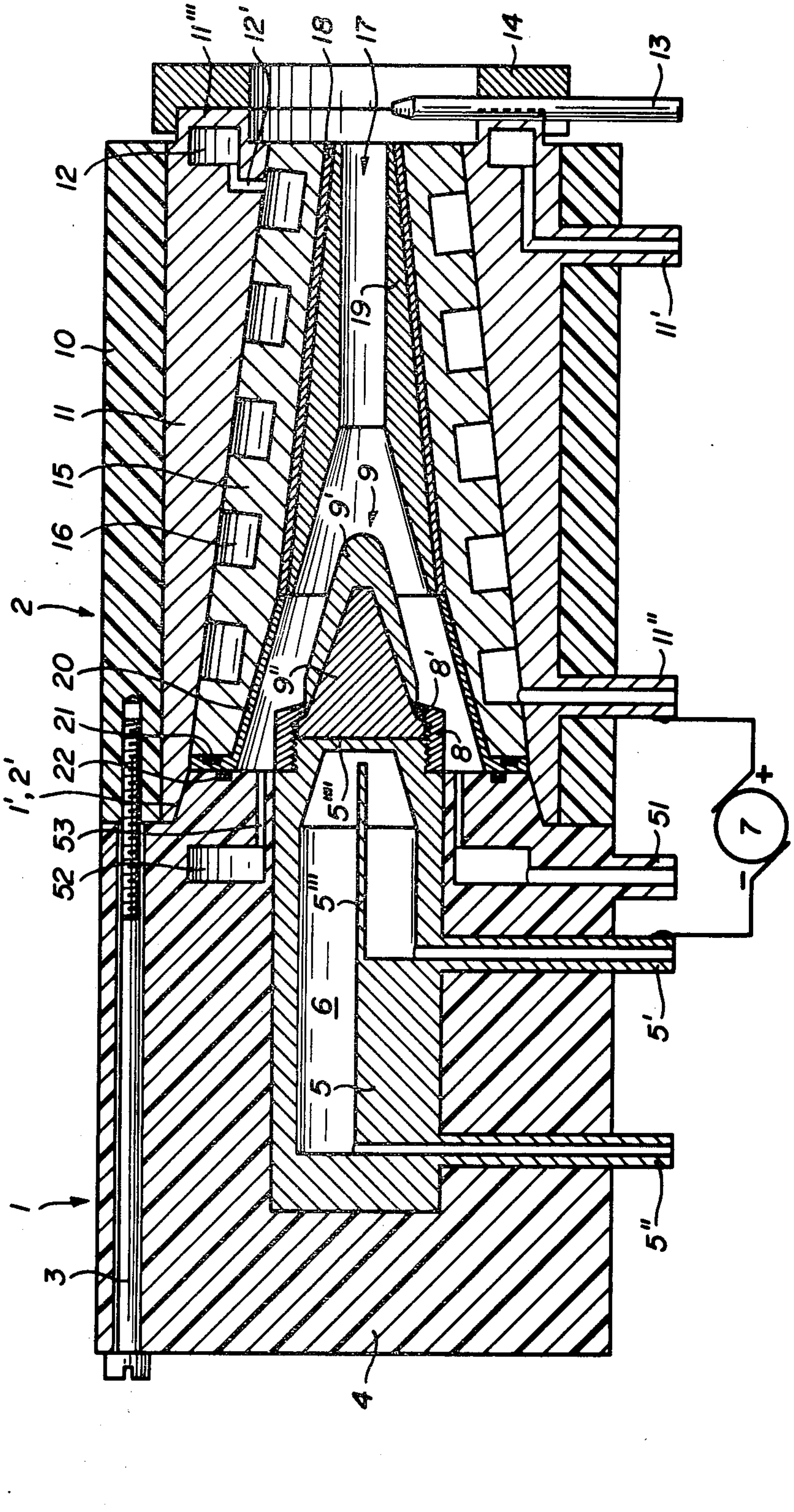
11'''
12'
18
17
14
13
12
10
11
15
16
19
9'
9
11'
2
20
21
22
1',2'
53
52
9''
8'
8
5''''
5'''
5
6
5
1
3
4
11''
51
7
+
−
5'
5''

PLASMA-ARC SPRAYING TORCH

The invention relates to a torch for plasma-arc spraying of powdered materials.

The torch according to the invention comprises a cathode unit and a separate anode unit connected to each other, each of said units being provided with a separate cooling circuit having each a water inlet and a water outlet connection, the cathode unit comprising an outer body part of insulating material, a cathode supporting member embedded in a body part and provided with the cathode cooling circuit, and a cathode part mounted replaceably on the said cathode supporting member, the anode unit comprising an elongated nozzle part forming the anode and a nozzle holder member laterally surrounding the said nozzle part, the nozzle holder member comprising at least two coaxial parts and being provide with an anode cooling circuit adapted to assure a forced cooling water flow along the nozzle part, the anode and cathode units each further comprising means for automatic centering these units in their connected state.

The well known process of plasma-arc spraying is becoming increasingly important on an industrial scale, particularly in the field of surfacing to provide specific desired surface qualities such as high wear resistance. It is also used for example in the production of solid parts from powdered materials.

New applications and new materials to be deposited require plasma torches for very high electric power to allow still higher working temperatures and increased spray rates. Presently available plasma torches are limited in their power by their relatively poor cooling capacity. Efforts have been made to improve the same by increasing the cooling water pressure and lowering the water temperature upstream the torch, which solutions however require costly feeding equipment and lead to other disadvantages such as sealing and operational problems. Furthermore, the present torches are of very complex structure, which makes the replacement of the parts subjected to wear a very time consuming and complicated operation.

It is a main object of the invention to provide a plasma-arc torch of particular simple and reliable design, for which the time needed for replacing the cathode and anode parts subjected to wear is considerably reduced. More particularly the invention aims to achieve easy access to the parts to be replaced and to avoid the necessity for disconnecting the cooling water circuits and for centering the replaced parts.

A further object of the invention is to improve the cooling of the various parts of the torch and more particularly to improve the cooling of the anode nozzle part and of the holding part for powder injection pipes. By improving the cooling, the duration of life of the parts subject to wear is increased at a given power level or the power at which the torch can be operated for a given life time of those parts is increased. Further objects and advantages of the invention will become apparent from the description of one embodiment thereof, given by way of example and illustrated in the attached drawings.

The single FIGURE of the drawing shows a longitudinal section through a plasma-arc torch according to the invention.

The plasma-arc spraying torch shown in the drawing is constituted by two main parts, namely a cathode unit 1 and an anode unit 2 which are connected to each other by four screws such as 3, 3' or by any other suitable means. The outer shape of these units is for instance substantially parallelepipedic but it can also be cylindric or of another appropriate kind.

The cathode unit 1 comprises a body part 4 of insulating material embedding a cathode supporting member 5 made of copper and having a generally cylindric shape with two connection tubes 5', 5'' laterally extending through the body part 1. Cathode supporting member 5 has an inner chamber 6 divided in two parts by a longitudinal separating wall part 5''' ending in the vicinity of a relatively thin front wall portion 5'''' of member 5. The shown arrangement provides for a forced cooling waterflow through water inlet connection tube 5' to the front wall portion 5'''' and a water outlet tube 5''. One or both of the tubes 5', 5'' also serve for the electric connection of cathode supporting member 5 to the negative pole of a current generator 7 as schematically shown in the drawing. Cathode supporting member 5 is embedded nearly entirely in the insulating body part 1 with only the front wall portion 5'''' longitudinally protruding and having an outer thread portion. A cap screw 8 is screwed on the said thread portion for holding a cathode part 9 and fixing the same tightly to the front wall portion of member 5, the contacting surface being preferably a plane surface as shown in the drawing.

Cathode part 9 is of a generally conical shape and is constituted by a compound piece comprising an outer electrode part 9' made of tungsten and an inner or core part 9'' of copper. Cap screw 8 has a conical inner surface 8' cooperating with a corresponding conical surface on the base portion of cathode part 9 for adjusting the cathode part in precisely defined centered relationship with respect to the cathode supporting member and therefore also with respect to the whole cathode unit 1.

A gas inlet connection 51 is provided on the body part 4 of the cathode unit and communicates with an annular chamber 52 formed inside the body part. A series of holes 53 is extending through the front part of the body 4 in the vicinity of the cathode part to allow injection of a plasma forming gas into the space surrounding the cathode part.

The anode unit 2 comprises a mantle part 10 of insulating material having an outer shape corresponding substantially to that of the cathode unit 1. A metallic part 11, for instance of copper, having a generally cylindric outer shape is embedded in the mantle part with two connection tubes 11', 11'' extending through the said mantle part. Tube 11' constitutes a cooling water inlet connection and communicates with an annular cooling chamber 12 provided in the front portion of part 11. More particularly, the said front portion comprises an axially protruding part 11''' of generally annular shape having a plurality of radially extending holding slots for holding powder injection pipes such as 13. Pipes 13 can be placed at desired radial positions in part 11''' and are maintained therein by a holding range 14 which is mounted on part 11 for instance by screws not shown in the drawing.

The annular cooling chamber 12 is extending close to the bottom of the holding slots and has a single outlet opening 12' directed towards the inner surface of part 11. The said inner surface is a conical surface the diameter of which increases in the inward direction of the torch. A nozzle holder part 15 having a corresponding conical outer surface is fitted inside part 11. A helical groove 16 is provided along the conical surface of part 15, the one end of said groove facing the outlet 12' of cooling chamber 12 and the other end thereof facing an opening in part 11 communicating with tube 11". The helical groove 16 forms together with the inner surface of part 11 a cooling water duct in which the water flows from the mouth part of the nozzle holder member to the inner part thereof, tube 11" constituting the outlet connection of the corresponding cooling circuit. One or both of tubes 11', 11" also provide electric connection of the anode of the torch with the positive pole of generator 7.

The anode takes the form of a nozzle part 17 being a compound piece with a mantle part 18 of copper and an inner nozzle part 19 of tungsten. The whole nozzle part 17 is placed inside the nozzle holder member with its outer conical surface fitting a corresponding conical inner surface of part 15, the diameter of these surfaces being decreasing towards the mouth part of the torch. The inner surface of the nozzle can have any suitable shape and can comprise a cylindric portion and an adjacent conical portion as shown in the drawing. A conical sleeve 20 is provided adjacent the nozzle part, which sleeve is placed in a corresponding conical portion of the nozzle holder member for maintaining the nozzle part in its axial position. One end of sleeve 20 is preferably constituted by a flange bearing on the end portion of the nozzle holder part 15, with a sealing ring 21 provided therebetween.

The cathode unit 1 and the anode unit 2 have corresponding conical adjusting surfaces designated respectively by 1' and 2', which surfaces are precisely coaxial with the cathode part 9 and the anode nozzle part 17 respectively. The adjusting surfaces are arranged so as to fit on each other when the cathode and anode units are assembled. Furthermore, a front portion of the cathode unit 1 is adapted to bear against the outer surface of the said flange of sleeve 20 in the assembled state of the torch, a sealing ring 22 being provided between these two parts.

In the present plasma-arc spraying torch therefore only two main parts, the cathode and anode units, are provided, which only need to be gas tight sealed (by rings 21, 22). Due to the fact that these units have each a separate cooling circuit, the torch can be opened for replacement of the cathode and anode parts subjected to wear (9, 17) without disconnecting the cooling circuit, which contributes to greatly simplify the replacement operation. Another important feature regarding this point is the easy self-centering mounting of the cathode part on the cathode supporting member thanks to the cap screw 8 with conical surface 8' and of the assembly of the cathode and anode units thanks to the conical adjusting surfaces 1', 2'. It is also to be noted, that the connection surface of the anode and cathode units is situated at a section of the torch in which the cathode part is mounted on its supporting member, so that it is most easily accessible. This, together with the easy replacement of the indirectly cooled anode nozzle part 17 and the above mentioned features, provides for a very substantial reduction of the time needed for the replacement of the anode and cathode parts (9, 17), which in fact is cut down from more than one hour in usual torches, to about a minute in the present device.

As already mentioned, the design of the plasma torch according to the invention avoids the need of opening the cooling circuits for replacing the parts subjected to wear. This allows to spare any O-ring sealings and together with the simplification of the cooling circuit, the efficiency thereof can be increased. As results from the description, the cathode part is most effectively cooled by the provision of a large plane seat surface for contact between core part 9" and the thin front wall portion 5"" of the cathode supporting member, itself cooled by forced water flow. As to the anode cooling circuit it presents a couple of important features. First, the incoming cooling water is directed to the front part of the torch which is most exposed to heat and very effective cooling is provided by the annular chamber 12 arranged as close as possible to the powder injection pipes. This increases the life-time thereof, protects the connection hose and prevents the powder from being baked. The nozzle part itself is cooled by forced water flow through helical duct 16 which provides for a very large contact surface for the heat exchange. Of course, other shapes of a water conducting space of large surface can be used, f.i. a longitudinal chamber with cooling ribs. The shown structure however is of great simplicity and efficiency. The conical contact surfaces provide sufficient sealing between parts 11 and 15 and only the end portions may be sealed against outside by soldering.

It is to be noted, that the elongated design of the cooling space allows an optimum relationship between the size of the cooling surface and the outside diameter of the nozzle holding member. Furthermore, it can be seen from the drawing, that in the torch according to the invention cooling can be extended up to the vicinity of the base of the cathode part for protecting the whole anode part surrounding the cathode. This results from the arrangement of the gas inlet and gas distribution chamber in the body part 4, thus behind the cathode.

The cathode and anode parts subjected to wear have substantially increased life-time and support higher electric power thanks to the mentioned efficient cooling. They are also designed to comprise outer parts of tungsten for increasing their life-time, while the contact making parts are of copper to provide very good thermal and electric contact.

It results from the above, that the torch according to the invention presents the most important features allowing it to be used on a large industrial scale at a very high power level and spray rate while requiring a minimum of time and skill for maintenance.

I claim:

1. A torch for plasma-arc spraying of powdered materials, comprising a cathode unit and a separate anode unit connected to each other, each of said units being provided with a separate cooling circuit having each a water inlet and a water outlet connection, the cathode unit comprising an outer body part of insulating material, a cathode supporting member embedded in said body part and provided with the cathode cooling circuit, and a cathode part mounted replaceably on the said cathode supporting member, the anode unit comprising an elongated nozzle part forming the anode and a nozzle holder member laterally surrounding the said nozzle part, the nozzle holder member comprising at least two coaxial parts and being provided with an anode cooling circuit adapted to assure a forced cooling water flow along the nozzle part, the anode and cathode units each further comprising means for automatic centering these units in their connected state, and wherein the connection surface of the anode and cathode units is situated substantially in a section of the torch in which the cathode part is mounted on the cathode supporting member, said separate cooling circuits for said cathode and anode units being respectively self-contained within said units, whereby said units can be disassembled from one another for replacing one or more of said cathode part and said nozzle part without disturbing the continuity of said respective separate cooling circuits.

2. A plasma torch in accordance with claim 1, wherein the cathode part and the cathode supporting member have at least one plane contact surface.

3. A plasma torch in accordance with claim 2, wherein the cathode part is mounted on the cathode supporting member by means of a cap screw.

4. A plasma torch in accordance with claim 3, wherein the cap screw and the cathode part have respective conical adjusting surfaces for automatically centering the cathode part on the cathode supporting member.

5. A plasma torch in accordance with claim 1, wherein the cathode part is constituted by an outer electrode part of tungsten and a core part of copper.

6. A plasma torch in accordance with claim 1, wherein the nozzle part has a conical lateral outer surface and the nozzle holder member has a corresponding conical inner surface, a coaxial fixing sleeve being fitted in the nozzle holder member adjacent the broader end portion of the nozzle part.

7. A plasma torch in accordance with claim 1, wherein the nozzle holder member comprises a lateral mantle part of insulating material.

8. A plasma torch in accordance with claim 1, wherein the nozzle holder member comprises a water duct surrounding the nozzle part, the inlet of the duct being placed at the downstream end of the nozzle part.

9. A plasma torch in accordance with claim 8, wherein the cooling water duct is helically arranged around the nozzle part.

10. A plasma torch in accordance with claim 1, wherein the nozzle holder member comprises first and second coaxial parts fitted inside one another and defining a cooling water duct there between, and wherein the surface of contact between the said two parts of the nozzle holder member is a conical surface.

11. A plasma torch in accordance with claim 1, wherein the nozzle holder member has a protruding holding part having holding slots for holding powder injection pipes, a holding member mounted to said protruding holding part for maintaining the powder injection pipes in said slots, the said holding part being formed around the downstream end of the nozzle part and containing a cooling water duct.

12. A plasma torch in accordance with claim 11, wherein the inlet of the water duct of the protruding holding part is connected with the inlet connection of the anode cooling circuit, the outlet of the said water duct of the holding part being connected to a cooling water duct surrounding the nozzle part.

* * * * *